United States Patent [19]

Eklund et al.

[11] 4,208,714
[45] Jun. 17, 1980

[54] APPARATUS FOR GIVING PRIORITY TO CERTAIN DATA SIGNALS

[75] Inventors: Mats F. Eklund, Stockholm; Hans O. S. Kjøller, Västerhaninge; Anders B. J. Nyman, Hägersten, all of Sweden

[73] Assignee: Telefonaktiebolaget L M Ericsson, Stockholm, Sweden

[21] Appl. No.: 879,361

[22] Filed: Feb. 21, 1978

[30] Foreign Application Priority Data

Feb. 28, 1977 [SE] Sweden .................. 7702143

[51] Int. Cl.² .................. G06F 7/00; G06F 13/00
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,328,772 | 6/1967 | Oeters | 364/200 |
| 3,573,745 | 4/1971 | May | 364/900 |
| 3,699,530 | 10/1972 | Capowski et al. | 364/200 |
| 3,818,461 | 6/1974 | Ward et al. | 364/900 |
| 3,878,513 | 4/1975 | Werner | 364/200 |
| 3,889,243 | 6/1975 | Drimak | 264/200 |
| 3,924,245 | 12/1975 | Eaton et al. | 364/200 |
| 4,047,162 | 9/1977 | Dorey et al. | 364/900 |
| 4,062,059 | 12/1977 | Suzuki et al. | 364/900 |

Primary Examiner—James D. Thomas
Assistant Examiner—David Y. Eng
Attorney, Agent, or Firm—Hane, Roberts, Spiecens & Cohen

[57] ABSTRACT

The invention relates to an apparatus in a computer system for transmitting signals from one processor to one or several other processors connected to the same bus system so that the signals having priority are transmitted without time delay and that the sequence of signals without priority is not changed. Each processor contains a sender buffer for sending all the signals and a queue buffer for storing signals without priority. If signals having no priority prevent signals having priority from being transmitted through the bus system because of congestion in the receiving equipment, the apparatus allows such signal having no priority to move from the sender buffer to the first place in said queue buffer. The apparatus also includes detecting means which activate a logical circuit when the following conditions are fulfilled:

a the sender buffer is occupied;
b there is congestion in the receiving device;
c the signal in the sender buffer is a signal without priority; and
d a signal having priority is to be fed into the sender buffer When the logical circuit is activated it delivers an output to a control signal circuit which, when activated, produces a signal on a first output and with a slight time delay produces a signal on a second output. The first of these output signals activates gate circuits for moving the contents of the sender buffer into the first place in the queue buffer. The second of said output signals activates a gate circuit for feeding the signal having priority into the sender buffer.

1 Claim, 1 Drawing Figure

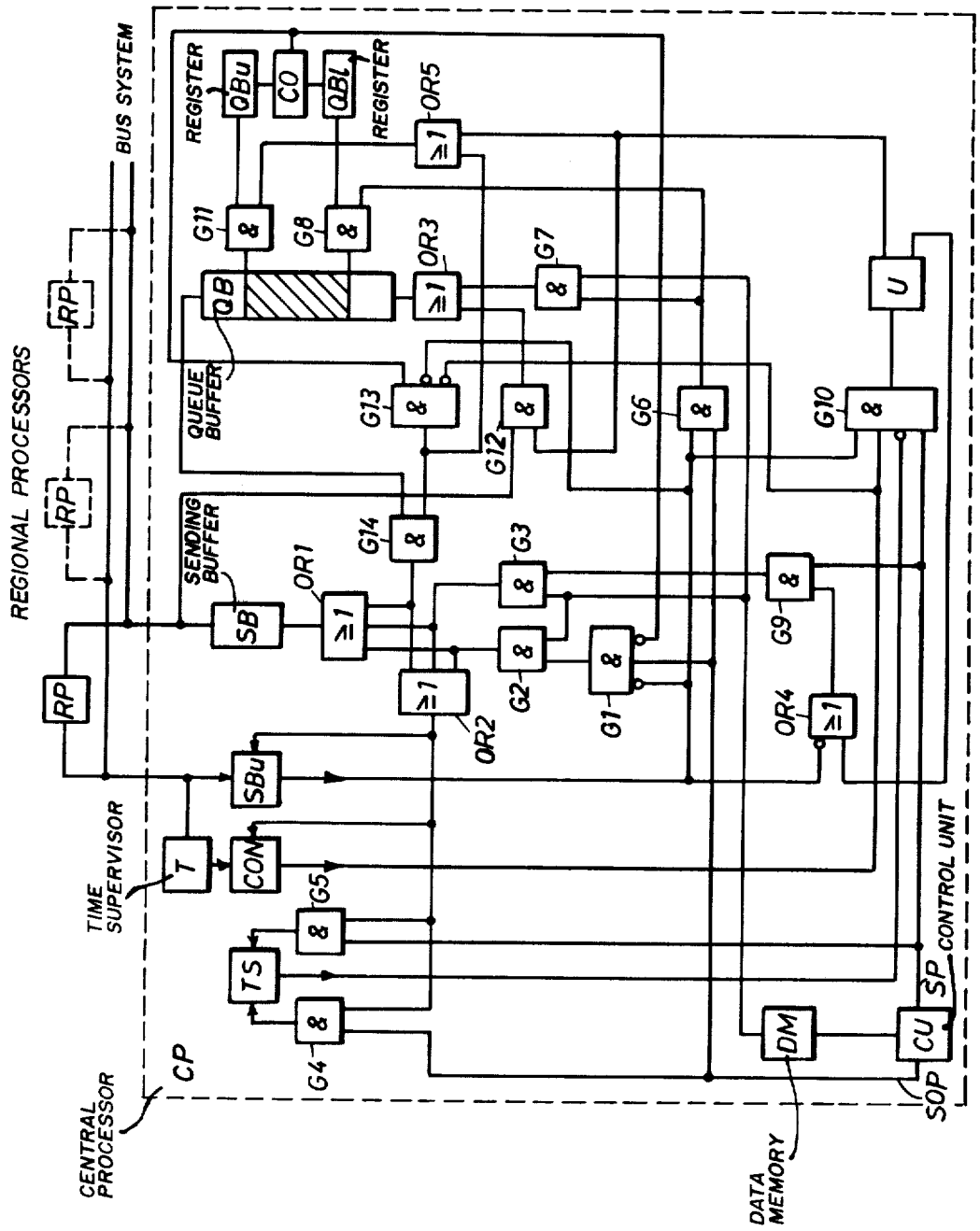

APPARATUS FOR GIVING PRIORITY TO CERTAIN DATA SIGNALS

BACKGROUND OF THE INVENTION

The invention relates to apparatus in a computer system for transmitting signals from one processor to one or several other processors connected to the same bus system wherein each processor contains a sender buffer for sending all the signals and a queue buffer for storing signals without priority, so that the signals having priority are transmitted without time delay and that the sequence of signals without priority is not changed.

In computer systems there is a need for exchange of signal information between processors connected to the same bus system. During such a signal exchange the problem arises that the processors treat the signals very rapidly in relation to the delay through the signal transmitting means, so that queues arise. The occurrence of queues will result in worse utilization of the capacity of the processors as they are subject to long periods of waiting.

In order to solve the problem that queues arise in known systems a buffer memory of some kind is used, e.g., as is shown in the Swedish Patent application No. 313.849. The disadvantage of known systems is that no difference is made between signals with no priority and signals having priority when loading them into the sender buffer thus a signal without priority that will be sent to the processor can be waiting and block a signal having priority that will be sent to another processor.

The invention, which solves the mentioned problem, is characterized according to the claims.

BRIEF DESCIPTION OF THE DRAWING

The invention is described more in detail below by means of an embodiment with reference to the accompanying drawing whose sole FIGURE shows a block diagram of an arrangement according to the invention included in a computer connected through a bus system to one or more computers.

DESCRIPTION OF THE PREFERRED EMBODIMENT

The apparatus, according to the invention, is included in, e.g., a central processor CP, shown in the FIGURE. The task of the processor inter alia is to exchange information signals with other processors, e.g., regional processors RP connected to the same bus system. As appears from the FIGURE, the apparatus includes a sender buffer SB the task of which is to store a signal composed of several signal words and to send that signal towards the bus one signal word at a time. The buffer SB is only storing one such signal at a time. The apparatus further contains a queue buffer QB for storing a number of signals without priority and if the sender buffer SB is occupied, said signals are put at the end of the queue buffer except for when, as later shall be shown, a signal without priority has been removed from the sender buffer by a signal having priority. The signal without priority is then put as first into the queue buffer QB. To the queue buffer are connected two registers QBu and QB1. The register QBu indicates the first occupied position in the queue buffer and the register QB1 indicates the first free position in the queue buffer. To the sender buffer SB is connected a flip-flop SBu the task of which is to transmit a signal the polarity of which is determined by the free or occupied state of the sender buffer. A logical zero signal from the flip-flop indicates that the buffer is free, a logical one signal from the flip-flop indicates that the buffer is occupied. A further flip-flop CON has the task of giving information about whether congestion occurs in a receiving processor or not.

A logical zero signal from the flip-flop indicates that the receiving processor is not blocked while a logical one signal from the flip-flop indicates that the processor is busy. A time supervision circuit T has the function to transmit, after the reception of an acknowledgement signal from the regional processor, an acknowledgement signal after a certain time period to the flip-flop CON in order to give information that the regional processor has received the message. If an acknowledgement signal fails to arrive from a receiving processor, it is considered to be blocked and a logical one signal is transmitted from the flip-flop CON. A flip-flop TS has the purpose of giving information about which type of signal is stored in the sender buffer SB. A zero from TS indicates that a signal without priority is placed in the buffer, while a logical one from the flip-flop TS indicates that a signal having priority is placed in the buffer. A logical circuit consisting of a number of AND-circuits and OR-circuits has the purpose of passing control- and data signals from the control unit and the data memory of the processor to the various buffers. In connection with the FIGURE, signal paths and activated circuits for a number of different processes will be described below. For all purposes it is valid that a certain type of control signal is transmitted from the control unit CU in the central processor CP. The transmitting of a control signal SOP implies, e.g., transmission of a signal without priority from a data memory DM in the CP to the central processor receiving regional processor RP. Another control signal SP from the control unit implies transmitting of a signal having priority from the data memory in central processor CP to the receiving RP. Which type of signal that will be sent is determined by the micro-program of the computer.

First, it is assumed that a signal without priority is transmitted from central processor CP to a receiving processor RP. The sender buffer SB is assumed to be free and the flip-flop SBu then transmits a logical zero signal at the output. The receiving processor is not blocking. A zero signal is then sent from the flip-flop CON. The signal without priority is transmitted from the data memory DM and activates one input of an AND-circuit G2. From the control unit originates simultaneously a signal SOP which activates an input of an AND-circuit G1 to the second input of which the output is fed from the flip-flop SBu that, when the sender buffer SB is free, transmits a zero signal. A third input of the circuit G1 receives a control signal from a comparator CO connected to the registers QBu and QB1. These second and third inputs of the AND-circuit G1 are inverted so that the circuit obtains three logical ones at the inputs and transmits at the output one signal that in turn is fed to the second input of the AND-circuit G2 so that the data signal is supplied to one of the inputs on an OR-circuit OR1 simultaneously as a pulse is transmitted to an OR-circuit OR2. From the output of the circuit OR1 the signal is fed into the sender buffer SB and therefrom to the receiving regional processor RP. When a pulse occurs at one of the inputs of the circuit OR2, it is conducting and sends a switching signal to the flip-flop SBu which marks that the sender buffer is occupied by transmitting a one at the output, whereby circuit G1 is blocked. The output from circuit OR2 is also supplied to an input of the AND-circuit G4 the second input of which is activated by the output from the control unit. The circuit G4 is now conducting and sends a switching signal to the flip-flop TS the output of which then produces a zero signal as long as the contents in the sender buffer SB is a signal without priority. The remaining logical circuits which at one of their inputs are affected by the mentioned signals, do not fulfill the conditions on their other inputs and are for that reason blocked. When the receiving processor RP has received the signal from the sending processor CP, it sends an acknowledgement signal to CP whereby the flip-flop SBu is set and transmits a zero signal at the output as an indication that the buffer SB now is free. The acknowledgement signal is also supplied to the input of the time supervision circuit T the output of which is not affecting the blocking flip-flop CON, since the acknowledgement signal has been obtained within a given time.

If a signal without priority is to be sent, but the sender buffer SB is occupied, said signal without priority must be stored in the queue buffer QB for later transmission when the sender buffer has become free again. As previously described the flip-flop SBu produces a one signal when the sender buffer is occupied. This one signal is supplied to the inverted input of the AND-circuit G1 which subsequently is blocked. Also circuit G2 is blocked, since circuit G1 is not producing any output. Circuit G2 thus blocks outgoing data towards the sender buffer. The signal SOP from the control unit CU is supplied to one input of an AND-circuit G6 the second input of which is activated by the one signal from the flip-flop SBu. The circuit G6 is thus conducting and its output is activating one of the inputs of an AND-circuit G7 the second input of which is activated by the data signal from the data memory DM. The circuit G7 is conducting and lets through the data signal that affects the input of an OR-circuit OR3 that forwards the data signal to the queue buffer QB. The output from the AND-circuit G6 also affects one of the inputs of an AND-circuit G8 the second input of which is affected by the output from the address register QB1 belonging to the queue buffer. The mentioned output selects the first free position in the queue buffer and points out, after having been connected to the buffer through the circuit G8, in which position the data signal incoming to the buffer should be stored.

When a signal having priority should be sent from CP towards an RP, the following signal paths are obtained. The sender buffer SB is assumed to be free, whereby the flip-flop SBu, as has been shown earlier, sends a zero signal. This zero signal affects an inverting input of an OR-circuit OR4 which transmits an output to one of the inputs of an AND-circuit G9, the second input of which is affected by the control signal SP from the control unit CU implying transmission of a signal having priority from the data memory DM. The output from the conducting circuit G9 is supplied to one of the inputs of an AND-circuit G3, the second input of which is activated by the mentioned data signal having priority, from the data memory DM. The output from the AND-circuit G3 is fed through the OR-circuit OR1 to the sender buffer SB. Said output is also fed to one of the inputs of the OR-circuit OR2 which is conducting and on its output sends a set signal to the flip-flop SBu which is set to the one signal position in order to indicate that SB is occupied and in order to block transmission of signals towards the sending buffer. The output from OR2 further affects the input of the AND-circuit G5 the second input of which is affected by the signal from the control unit, i.e., the same SP signal which affects the AND-circuit G9. Thus, the signal sent from circuit G5 is a set signal for the flip-flop TS which subsequently produces a one signal at the output as long as a signal having priority is located in the sender buffer SB. When buffer SB has sent a signal to the receiving processor RP, the latter sends back an acknowledgement signal, whereby the flip-flop SBu returns to a zero signal position which indicates an idle sender buffer SB.

When a signal having priority is sent, the sender buffer SB can be occupied.

It is necessary that a signal having priority shall be transmitted without time delay, but if transmission of a signal with no priority is going on, the transmission is allowed to be completed without interruption. The signal having priority tolerates this small time delay and remains in the data memory DM until the sender buffer is idle again. The flip-flop SBu sends a one signal from its output to the circuits G1 and OR4 which subsequently are blocked and when circuit G6 also is blocked by a zero signal from the control unit Cu, no signals are able to reach either of the buffers SB and QB. The signal having priority thus remains in the data memory. When the transmission is terminated and an acknowledgement signal arrives to the flip-flop SBu from a receiving processor RP, the output of the flip-flop changes polarity form one to zero, whereby the OR-circuit OR4 is conducting and the data signal having priority is fed into the sender buffer.

It may occur that a signal having priority should be transmitted when the sender buffer SB is occupied by a signal without priority and there is a congestion in the receiving processor so that the signal in the sender buffer SB cannot be sent. The signal without priority located in buffer SB subsequently must be transferred to the queue buffer QB to leave room for the signal having priority. The signal thus transferred is in this case stored first in the buffer memory QB.

The signal without priority is removed from buffer SB to buffer QB as described below. The flip-flop SBu produces a one signal at the output, the output of the OR-circuit OR4 ceases, whereby the AND-circuit G9 is blocked so that no signal is sent towards the sender buffer. An AND-circuit G10 having four inputs is activated by means of a one signal from the flip-flop SBu, by a one signal from the flip-flop CON since there is blocking condition, by a zero signal from the flip-flop TS as the sender buffer contains a signal without priority (this input to the circuit G10 is inverting) and by the control signal SF from the circuit unit which normally affects transmission of a data signal having priority. When all the inputs of the ciruit G10 are activated, the circuit sends an output to a unit U which initiates a two-step process whereby the following occurs in step one: The output signal from a first output of the unit U activates one of the inputs of an OR-circuit OR5, which at its output is forwarding the signal to one of the inputs on an AND-circuit G11 the second input of which is activated by the signal from the address register QBu. The output from register QBu selects the first position in the queue buffer QB through the gate G11. Said output from the unit U also affects one of the inputs of an AND-circuit G12, the second input of which is activated by the signal without priority from the output of the sender buffer SB. Through the circuit G12 and the OR-circuit OR3 such signal without priority is fed into the queue buffer QB and is there located first in the queue which is indicated by the signal from the register QBu. The signal without priority is hereby transferred to the queue buffer QB.

The next phase in the process occurs when the signal having priority will be fed into the presently free sender buffer SB. The flip-flop SBu produces a one signal in spite of the fact that SB is free, since no acknowledgement signal has been received from the regional processor RP. In the unit U an output signal from a second output, which for example through a delay circuit is connected to the first output, activates an input of the OR-circuit OR4, the output of which activates one of the inputs of the AND-circuit G9, the second input of which is affected by the control signal SP from the control unit CU that causes transmission of a data signal having priority. The output from the circuit G9 is supplied to one of the inputs of a circuit G3, the second input of which is activated by the data signal having priority and sent from the data memory. This signal is fed to the sender buffer SB through the circuits G3 and OR1. The output from the circuit G3 further affects an input of the OR-circuit OR2, the output of which is a set signal for the flip-flop SBu in order that this should produce a one signal when SB is occupied. The set signal further zero sets the flip-flop CON whereby the circuit G11 is blocked and activates one of the inputs of the AND-circuit G5, the second input of which is activated by the same control signal sent from the control unit as affects the circuit G9. The circuit G5 subsequently sends a set signal to the flip-flop TS, which in turn produces a one signal as a sign that a signal having priority occupies the sender buffer SB.

When the sender buffer is idle and no blocking exists in the receiving processor, the flip-flops SBu and CON both produce a zero signal at their outputs whereby the signal in the queue buffer is fed to the sender buffer. Since no control signals are sent out from the control unit to the AND-circuits G1 and G9, the latter are blocked and no data signals can subsequently be fed into the sender buffer from the data memory DM. The zero signals from the flip-flops SBu and CON activate each one inverting input of an AND-circuit G13, the third input of which is activated by a signal from the comparator CO connected to the registers QBu and QB1, which comparator generates a one signal when QBu and QB1 are different, and a zero signal when the registers are equal, i.e., when the queue buffer QB is empty. When the circuit G13 has obtained a one signal at all its inputs, it produces an output which on one hand activates one of the inputs of an AND-circuit G14, on the other hand is connected to one of the inputs of the OR-circuit OR5. The circuit OR5 conducts and supplies a signal to one of the inputs of the OR-circuit G11 the second input of which obtains a signal from the output of the registers QBu. The circuit G11 is activated and its output activates the queue buffer QB so that the signal without priority, stored ih the buffer and located first in line, is fed from the buffer to the second input of the AND-circuit G14 which forwards the signal to the sender buffer SB through the OR-circuit OR1. The output from G14 simultaneously affects the circuit OR2, which in turn passes the set signal to the flip-flop SBu, which produces a one signal when the sender buffer is occupied again. After a completed transmission and after having received an acknowledgement signal and flip-flop SBu is again zero set.

In order to prevent signals without priority in the data memory having preference to signals without priority in the queue buffer, the output from the circuit CO is connected to an inverting input of the circuit G1. From the circuit CO there is always obtained a one signal as long as any signal is stored in the queue buffer. When such one signal is fed to the inverting input of the circuit G1, the circuit is blocked so that the circuit G2 is also blocked and prevents further transmission of signals from the data memory.

A further case may occur when the sender buffer SB is occupied by a signal having priority and another signal having priority will be sent out to, e.g., another receiving processor. This is a fault which requires some kind of fault clearing.

The greatest advantage with the arrangement according to the invention is, as appears from the description, that a considerably better use can be made of the computer capacity.

We claim:

1. Computer system for transmitting information signals from a sender processor to one or several other receiving processors connected to the same bus system so that information signals having priority are transmitted without time delay and that the sequence of information signals without priority are not changed, each processor containing a data memory means for delivering all the signals and a control means for controlling the data memory means, said computer system comprising, in the sender processor;

a sender buffer means for sending all the information signals to the bus system;

a queue buffer means for storing a number of information signals without priority in a sending sequence;

a first means for producing an indicating signal from said sender buffer means, when said sender buffer means is occupied or not;

a second means for producing a congestion signal when congestion occurs in a receiving processor;

a third means for producing a priority state signal when the information signal in the sender buffer is a priority information signal;

a first control logic means, connected to the outputs of said first, second and third means, for producing a control signal when activated by the simultaneous reception of signals from said first, second and third means;

a control signal circuit means connected to the output of said first control logic means and having a first and second output for producing in time sequential signals when said control signal circuit means is activated by said first control logic means;

a first gate circuit means connected to said first output of said control signal circuit means for controlling the movement of the contents of said sender buffer means to said queue buffer means when activated by a signal from said first output of said control signal circuit means;

a second gate control means connected to said first output of said control signal circuit, for writing the contents of said sender buffer received via said first gate circuit means into the queue buffer means as first output signal of the queue;

a third gate circuit means connected to said second output of said control signal circuit means, when activated for feeding an information signal having priority to the sender buffer means; and a control logic means, connected to said first and second means, for controlling the movement from said queue buffer means to said sender buffer means the information signal stored in said queue buffer means as first output signal of the queue.

* * * * *